Figure 1:
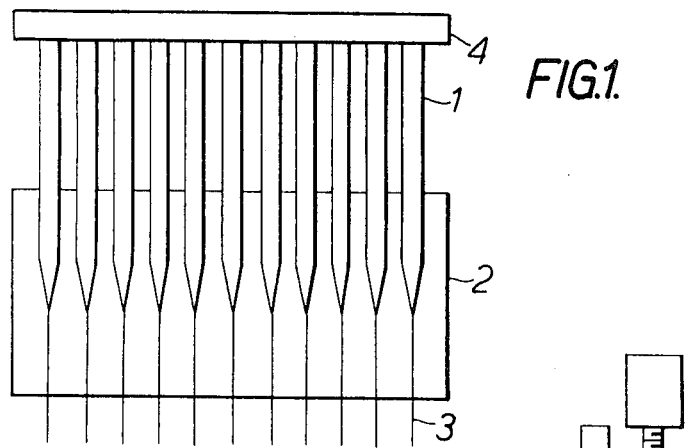

United States Patent
Elliot

[15] 3,655,352
[45] Apr. 11, 1972

[54] METHOD OF MAKING CONTINUOUS FIBER BUNDLE

[72] Inventor: Ian R. Elliot, Leeds, England
[73] Assignee: The Rank Organisation Limited, London, England
[22] Filed: Apr. 7, 1970
[21] Appl. No.: 26,237

[30] Foreign Application Priority Data

Apr. 25, 1969 Great Britain....................21,319/69

[52] U.S. Cl..................................65/4, 65/13, 65/DIG. 7, 65/12, 65/36, 65/38, 65/57
[51] Int. Cl..........................................C03c 23/20, C03c 29/00
[58] Field of Search...............65/DIG. 7, 13, 4, 57, 12, 36, 65/38

[56] References Cited

UNITED STATES PATENTS

| | | |
|---|---|---|
| 3,275,428 | 9/1966 | Siegmund....................65/4 |
| 3,350,183 | 10/1967 | Siegmund et al...........65/4 |
| 3,055,051 | 9/1962 | Schuller...................65/13 X |
| 3,278,283 | 10/1960 | Bazinet, Jr................65/4 |
| 3,294,504 | 12/1966 | Hick, Jr..................65/4 X |

FOREIGN PATENTS OR APPLICATIONS

| | | | |
|---|---|---|---|
| 239,719 | 2/1946 | Switzerland | 65/13 |
| 933,838 | 8/1963 | Great Britain | 65/13 |
| 321,346 | 5/1920 | Germany | 65/13 |
| 744,973 | 2/1944 | Germany | 65/13 |

*Primary Examiner*—Frank W. Miga
*Attorney*—Griffin and Branigan

[57] ABSTRACT

A method of producing long continuous bundles of fibers consists in drawing out and bringing together fibers from rods of softenable material of different lengths. The rods are moved transversely during the drawing operation in the direction from the longest to the shortest rod. As each rod becomes too short for further use it is removed, its place being taken by the next shorter rod, and as each rod previously the longest rod is moved transversely its place is taken by a fresh rod of maximum length. Apparatus for manufacturing long continuous bundles of fiber includes a furnace and means for moving the rods axially into the furnace. It also includes means for moving the rods transversely at the same time and means for inserting fresh rods of maximum length and removing rods of minimum length.

6 Claims, 6 Drawing Figures

METHOD OF MAKING CONTINUOUS FIBER BUNDLE

This invention relates to the manufacture of bundles of fibers, and particularly to the manufacture of bundles of optical fibers.

The most common method of manufacturing an optical glass fiber consists in feeding axially a rod of glass, usually consisting of a core contained within a sheath of glass of lower refractive index, into a furnace and drawing the melted leading end out into a fiber.

A known method of manufacturing a bundle of fibers is the same as that for manufacture of a single fiber as described above, several identical rods being fed simultaneously into the furnace, the several fibers being brought together to make a bundle.

The known method of making a bundle of fibers suffers from the disadvantage that the length of the bundle is limited by the length of the rods, i.e. the amount of material in each rod will make a fiber of a specific length. When the rods have been completely melted or when they have reached the minimum length which can be handled conveniently the process must be halted and then restarted using fresh rods. Although a considerable amount of machine-operating time is lost while the process is halted for the fitting of fresh rods this loss of time has had to be accepted because there was no known way of avoiding it. The task to be performed in providing bundles of any length as a continuous operation is to overcome the limitation of having to utilize fibers of finite length.

It is an object of the present invention to provide a method of and apparatus for producing fibers in bundles of any length as a continuous operation without halting the process or the apparatus.

A method of manufacturing a bundle of fibers according to the invention consists in melting the aligned ends of several spaced parallel rods of lengths progressively decreasing from a chosen maximum length to a chosen minimum length, drawing the melted ends down simultaneously into fibers while at the same time feeding the rods axially in the direction towards the ends being melted and simultaneously moving the rods transversely in a body in the direction from the longest rod to the shortest rod, placing a fresh rod of the maximum length in the position vacated by the immediately preceding rod of maximum length as soon as said rod has moved transversely a chosen distance, and removing each rod as soon as it becomes the chosen minimum length, the rate of transverse movement of the rods being in a constant ratio to the rate of axial feed of the rods and bringing the fibers together into a bundle.

Each rod may consist of glass, plastic or other heat-softenable material.

Each rod may consist of a glass core surrounded by a sheath of glass of lower refractive index. Alternatively each rod may be of the same composition throughout and each fibre drawn from the rod may be coated with a substance of chosen qualities before being bundled with other fibers. The material of the rod may be transparent and the coating substance may be opaque. Alternatively the coating substance may also be transparent but of lower refractive index than that of the rod.

Apparatus for performing the method includes a furnace, means for holding rods in spaced parallel relationship, means for moving the rods simultaneously axially into the furnace, means for moving the rods transversely in a body at a rate which is a constant ratio of the rate of axial feed, and drawing means operative when the ends of the rods in the furnace have been melted to draw the melted ends down to fibers.

The means for moving the rods transversely may be arranged to move the rods in a linear path or in a curved path, the furnace being correspondingly formed.

The means for holding the rods and moving them transversely may be conveyor belts fitted with holders for the rods. Preferably adjacent holders are all spaced the same unit of distance apart.

The means for holding the rods and moving them transversely may be combined with the means for feeding them axially and may consist of two spaced conveyors the belts of which are fitted with holders for the rods, the flight of at least one of the belts being oblique with respect to the axes of the rods.

In the construction described in the preceding paragraph the flights of one conveyor may be at right angles to the axes of the rods so that this conveyor is capable of imparting transverse movement only to the rods, the flights of the other conveyor being oblique with respect to the axes of the rods so that said other conveyor is capable of imparting a transverse component of movement to the rods and an axial component of movement for axial feed to the rods, the conveyors being geared to one another so that the rates of circulation of the respective belts remain in the required fixed constant ratio to provide the required ratio of transverse movement and axial feed.

Alternatively, the two conveyors may be disposed with their belts parallel with one another, the flights of both conveyors being oblique with respect to the axes of the rods. This construction has the advantage that both conveyors always circulate at the same speed with respect to one another thus avoiding complication in the apparatus.

The angle of the oblique conveyor may be variable with respect to the axes of the rods so that the rate of transverse movement of the rods may be varied with respect to the rate of axial feed. In the construction last mentioned in which one conveyor is oblique and one is at right angles to the axes of the rods the gear ratio between the conveyors must also be variable.

The apparatus may incorporate automatic means for inserting fresh rods of maximum length and removing rods of minimum length.

Rods of certain substances of high viscosity and/or high surface tension tend to produce fibers which have enlarged leading ends. A fiber having such an enlarged end cannot be accommodated in a bundle of fibers and in such circumstances the process may additionally consist in removing the enlarged leading end from the melted end of each fresh rod placed in the position vacated by an immediately preceding rod before said fiber is incorporated in the bundle.

The method of removing an enlarged leading end from a fiber may consist in sensing the presence of the enlarged end, then cutting the end from the fiber whereby to leave a free-hanging cut end and blowing the free-hanging cut end of the fiber towards the other fibres in process of forming the bundle.

Apparatus for performing the method of removing the enlarged leading end from a fiber may consist of an optical sensing device such as a photo-electric cell, a relay controlled by the photo-electric cell and a cutter mechanism operation of which is under the control of the relay.

The accompanying diagrammatic drawings illustrate in

Figure 2:
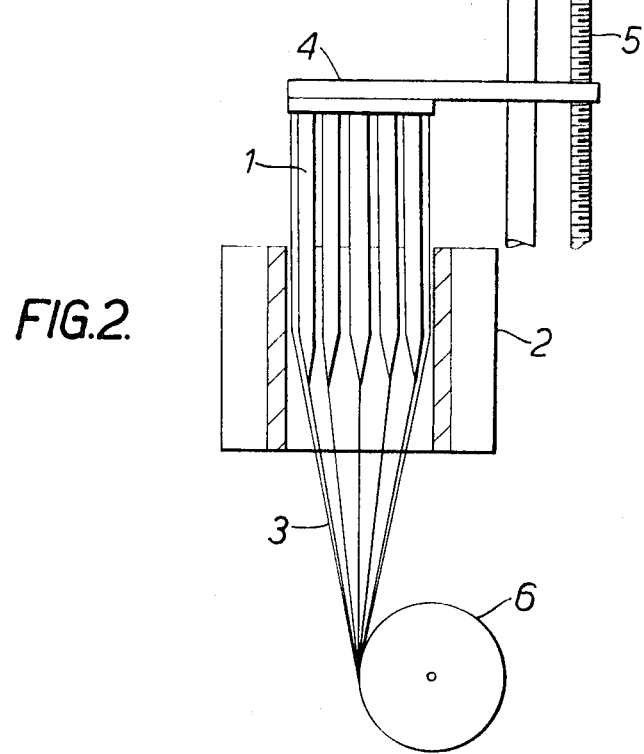

FIGS. 1 and 2 conventional apparatus for manufacturing fiber bundles, in

Figure 3:
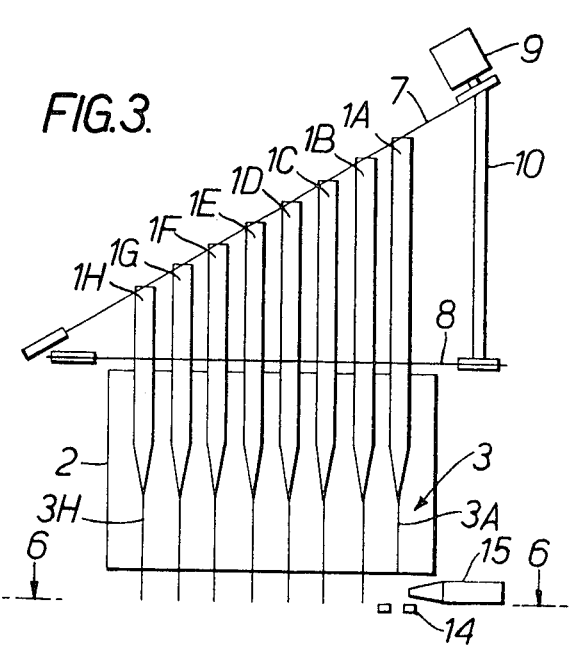

FIG. 3 apparatus according to the invention in which the rods are moved transversely in a linear path and in FIGS, 4 and 5 apparatus according to the invention in which the rods are moved transversely in a curved path.

Figure 5:
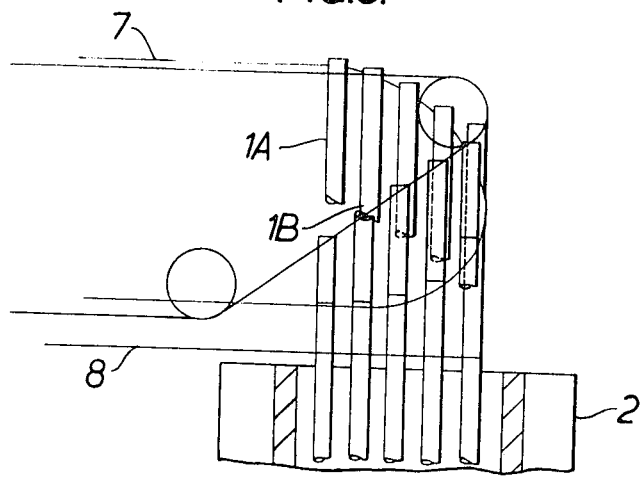
Figure 6:
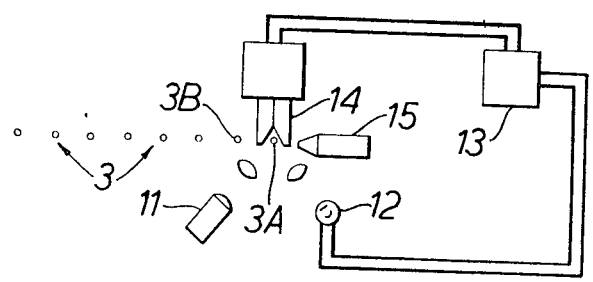

FIG. 6 is a section through the line 6—6 in FIG. 3. The construction illustrated in FIG. 6 is to be considered as also applicable to the embodiments of FIGS. 4 and 5.

In the drawings, 1 denotes rods, 2 denotes a furnace and 3 denotes fibers drawn out from the rods. In the conventional apparatus of FIGS. 1 and 2 the rods 1 are all the same length and are clamped to a bar 4 arranged to be moved towards the furnace 2 by a feed mechanism 5. The feed mechanism is shown only in FIGS. 2 but the apparatus of FIG. 1 employs a feed mechanism which may be the same as that illustrated in FIG. 2. 6 (FIG. 2) denotes a rotatable drum which serves as the means for drawing out the fibers and also as a receiver for the bundled fibers.

In FIG. 3 which is of apparatus according to the invention the rods 1A to 1H are of progressively decreasing length and are supported in holders fastened to the belts of two conveyors 7 and 8. Fibers 3A to 3H are drawn from the rods 1A to 1H respectively. The belt of the conveyor 7 is arranged to circulate obliquely of the axes of the rods 1A to 1H and the belt of the conveyor 8 is arranged to circulate at right angles to the axes of the said rods. 9 denotes a driving motor arranged to drive the conveyors 7 and 8, a gear mechanism 10 being effective to provide that the belts of the two conveyors circulate at speeds which remain in a fixed ratio to one another. In this construction the axes of the rods are co-planar.

Figure 4:
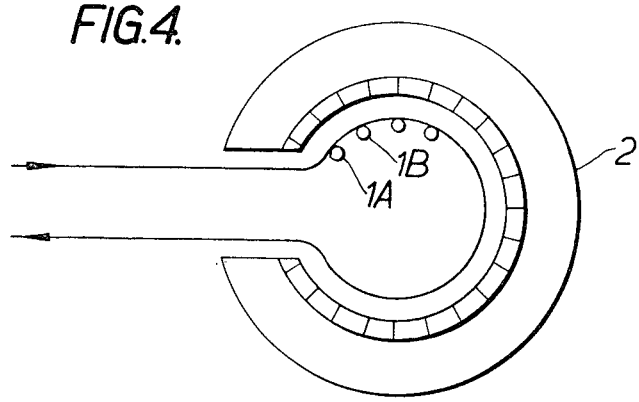

In the construction of FIGS. 4 and 5 the furnace 2 is circular, the rods are disposed in a circular formation within the furnace, and the belts of the conveyors are guided to pursue a curved path. Otherwise the apparatus is exactly the equivalent of that illustrated in FIG. 3.

In FIG. 6, 11 denotes a light source with lens system arranged to direct a beam against the fiber 3A drawn from the fresh rod 1A occupying the position vacated by the immediately preceding rod of maximum length, 12 denotes a photoelectric cell with a lens system arranged to receive light reflected from the fiber 3A and direct said reflected light into the photoelectric cell 12, 13 denotes a relay arranged to be controlled by the photoelectric cell 12 and being arranged in turn to control the operation of a cutter mechanism 14 so disposed that when operated it will cut the fiber 3A drawn from said fresh rod 1A. 15 denotes blowing means operative following operation of the cutter mechanism to blow the now free-hanging leading end of the fiber 3A toward the other fibers 3B–3H at present in process of forming the bundle.

In practice, in operation of the conventional apparatus illustrated in FIGS. 1 and 2 the rods which are all the same length are fed forward into the furnace all at the same speed and in an axial direction only. The rods, being all melted at the same rate, become all at the same time the minimum length which can be conveniently held. The apparatus must then be stopped so that an entire set of fresh rods can be loaded into the apparatus. Time is thus lost and the fiber bundle being made comes to an end.

In operation of the apparatus according to the invention illustrated in FIGS. 3, 4, 5 and 6, the rods are moved transversely with respect to the axes of the rods by the conveyors 7 and 8, the conveyor 8 imparting simple transverse motion and the conveyor 7 imparting a transverse component of motion, and are fed axially by the conveyor 7 which in addition to imparting a transverse component of motion to the rods also imparts an axial component of motion. The gear ratio of the gear mechanism 10 is arranged to provide that the linear speed of the conveyor 8 has the same value as the transverse component of the speed of the conveyor 7. When each rod reaches the position 1H which is the position reached by a rod of the chosen minimum length found to be convenient the rod is removed, and when each rod is moved a chosen distance from the position 1A which is the maximum length position a fresh rod of chosen maximum length is inserted in the space vacated by the immediately preceding rod.

When a fresh rod 1A is introduced a fiber 3A is drawn from the end of it. If the leading end of this fiber is enlarged the quantity of light from the light source 11 reflected back to the photoelectric cell 12 will alter. The cell 12 will cause the relay 13 to operate and set in motion the cutter mechanism 14 so that the enlarged end of the fiber 3A will be cut off and will drop out of the way thus leaving a new unenlarged leading end on the fiber 3A. Following operation of the cutter mechanism 14 the blowing means 15 will operate to blow the new leading end of the fiber 3A towards the other fibers 3B to 3H so that the fiber 3A will be caught and carried into the bundle being formed.

In the manner described one rod only is replaced at a time and the process is continuous. As a break in one fiber at long intervals in a bundle of fibers is not normally important continuous bundles of fibers of any length can be manufactured without a halt.

What is claimed is:

1. A method of manufacturing a bundle of fibers comprising first melting the initially aligned ends of several spaced parallel rods of lengths progressively decreasing from a chosen maximum length to a chosen minimum length, drawing the melted ends down simultaneously into fibers while at the same time feeding the rods axially in the direction towards the ends being melted and simultaneously moving the rods transversely in a body in the direction from the longest rod to the shortest rod, then while continuing the drawing operation placing a fresh rod of the maximum length in the position vacated by the immediately preceding rod of maximum length as soon as said rod has moved transversely a chosen distance, and melting the end of said fresh rod and drawing the melted end down into a fiber simultaneously with the melting and drawing of the other rods and removing each rod as soon as it becomes the chosen minimum length, the rate of transverse movement of the rods being in a constant ratio to the rate of axial feed of the rods and bringing the fibers together into a bundle including the fiber from each fresh rod added.

2. The method claimed in claim 1 in which each rod used in performing the method consists of a glass core surrounded by a sheath of glass of lower refractive index.

3. The method claimed in claim 1 in which the rods used in performing the method are all of the same composition throughout and the method includes the step of coating fibers drawn from the rods with a substance of chosen qualities before the fibers are brought together in a bundle.

4. The method claimed in claim 3 in which the rods are of transparent material and the coating substance used in performing the method is opaque.

5. The method claimed in claim 3 in which the rods are of transparent material and the coating substance is also transparent but of lower refractive index than that of the rods.

6. The method claimed in claim 1 including sensing an enlargement of the leading end of a fiber drawn from the melted end of the fresh rod placed in the position vacated by the immediately preceding rod of maximum length before said fiber is incorporated in the bundle, cutting off the enlarged leading end and blowing the new leading end of the fiber towards the other fibers in process of forming the bundle.

* * * * *